United States Patent [19]

Mohammed

[11] 4,144,357

[45] Mar. 13, 1979

[54] PREVENTING THE MAILLARD REACTION IN SYNTHETIC DIETARY COMPOSITIONS

[75] Inventor: Kasheed Mohammed, East Brunswick, N.J.

[73] Assignee: Johnson & Johnson, New Brunswick, N.J.

[21] Appl. No.: 808,765

[22] Filed: Jun. 22, 1977

[51] Int. Cl.$^2$ .................. A23L 1/00; A23L 1/187; A23L 1/40; A23L 2/00

[52] U.S. Cl. ........................... 426/96; 426/103; 426/331; 426/589; 426/579; 426/590; 426/804; 426/656

[58] Field of Search ............... 426/89, 96, 103, 302, 426/321, 533, 661, 589, 73, 74, 577, 804, 590, 331, 459, 471, 598, 656

[56] References Cited

U.S. PATENT DOCUMENTS

| | | | |
|---|---|---|---|
| 2,426,634 | 9/1947 | Melnick | 426/589 |
| 3,097,947 | 7/1963 | Kemmerer | 426/589 |
| 3,595,678 | 7/1971 | Shimazaki | 426/533 |
| 3,697,287 | 10/1972 | Winitz | 426/73 |
| 3,821,432 | 6/1974 | Mohammed | 426/573 |
| 3,903,295 | 9/1975 | Palmer | 426/96 |
| 3,950,547 | 4/1976 | Lamar et al. | 426/74 |
| 3,985,913 | 10/1976 | Johnson et al. | 426/96 |

*Primary Examiner*—Jeanette M. Hunter

[57] ABSTRACT

The Maillard-type browning reaction between (1) nitrogen containing compounds, such as amino acids, other nitrogen containing proteinaceous materials and nitrogen containing vitamins, and other non-proteinaceous nitrogen containing compounds and (2) such carbonyl compounds (aldehyde or ketone group containing compounds) as reducing sugars is prevented or substantially retarded, so as to improve the storage life, without otherwise altering the properties, of a solid composition containing both the nitrogen compounds and the carbonyl compounds, by separating the nitrogen compounds from the carbonyl compounds with a starch (which may be partially hydrolyzed) having a D.E. number between 0 and 24.

40 Claims, No Drawings

PREVENTING THE MAILLARD REACTION IN SYNTHETIC DIETARY COMPOSITIONS

BACKGROUND OF THE INVENTION

1. Field of the Invention

Most natural and processed foods contain one or more of intact protein, predigested protein (protein hydrolysates), amino acids and non-protein nitrogen. These nutrients are the building blocks of lean body mass (protein) and other nitrogen containing metabolites (for example, enzymes, vitamins, hormones, etc.). Carbohydrates normally present in foods can be simple (for example, dextrose, fructose, etc.) or very complex in nature (for example, fiber, pectin, starch, predigested starch [hydrolyzed cereal solids, dextrose oliogosaccharides, etc.], dextrin, etc.). Carbohydrates in foods supply energy, and desirable psychosensory benefits, such as taste and texture.

This invention concerns essentially residue free dietary compositions for supplying nitrogen nutritional requirements to users whose normal digestive processes are imparied as, for example, patients in catabolic disease states such as duodenal fistula, the short gut syndrome, pancreatitis, ulcerative colitis, and the like, as well as to pre- and post operative patients who are required to eliminate temporarily solid residues from their diet because of surgical intervention. The low residue compositions, designed to be readily absorbed in the duodenum and jejunum, result in minimal intestinal digestive activity and reduced frequency of defecation, with the quantity of fecal matter reduced to essentially endogenous amounts.

More particularly, the invention concerns solid dietary compositions (or concentrates) comprising at least one amino acid or other nitrogen containing material (nitrogen compound) and at least one carbonyl group-containing material (carbonyl compound) such as a reducing sugar, in admixture therewith, wherein the shelf life of the composition is extended by separating the nitrogen compound from the carbonyl compound with another, non-nitrogenous, relatively non-reducing ingredient of the dietary composition, namely a starch having a D.E. (Dextrose Equivalent) number of from 0 to about 24 so as to prevent or retard the Maillard-type browning reaction (hereinafter "Maillard reaction") between the nitrogen compound and the carbonyl group containing material. As used herein, the term starch includes the native starches and their derivatives (e.g. dextrin or chemically or enzymatically modified starch, commercially available as dextrose [or glucose] polymer, dextrose [or glucose] oligosaccharides, corn syrup solids, hydrolyzed starch or hydrolyzed cereal solids). By the expression "carbonyl group-containing material" or "carbonyl compound" as used herein is meant a compound wherein the carbonyl group is either a keto or aldehyde group. In accordance with the invention, the reactive compounds are separated by interposing the starch between the reactive components, typically by coating one or both of the nitrogen-containing material and the carbonyl group-containing material with the starch.

Many synthetic foods and special dietary products exist which contain, among other nutrients, amino nitrogen-containing (proteinaceous) compounds (e.g. one or more free amino acids or their salt derivatives, protein hydrolysates, intact whole proteins, or a combination of these) plus vitamins, including amino nitrogen containing vitamins, e.g. para-amino-benzoic acid (PABA), thiamine, niacin, choline, riboflavin, ascorbic acid, etc. and their derivatives, plus other, non-amino nitrogen-containing compounds, e.g. ammonium compounds such as ammonium sulfate, plus carbohydrates, including reducing sugars, e.g. glucose (also known as dextrose), fructose (also known as levulose) and 5-carbon or pentose sugars such as xylitol (also commonly called xylose), and other aldehyde containing compounds which may be found, for example in flavoring agents. Even non-reducing disaccharide sugars (e.g. sucrose, lactose, maltose, and their derivatives) may be hydrolyzed catalytically to produce the reducing sugar moiety, this reaction being promoted by the presence of moisture and elevated temperatures.

Over time, in the presence of moisture, and in even moderate heat (i.e. at temperatures above the freezing point of water), the Maillard/browning reaction results from the interaction of the nitrogen compounds with the aldehyde groups of the reducing sugars or other carbonyl compounds.

In some instances, a "browning" reaction is desirable — for example with butterscotch confections, caramel, cooked meats, etc. In other instances this reaction is objectionable — for example with fluid and dried milk and with special dietary products containing amino acids, hydrolyzed protein or intact protein.

When browning occurs in, for example, an elemental diet (a white powder composed of purified amino acids, carbohydrate, fat, vitamins, minerals and flavorings which, when reconstituted with water to a beverage, semi-solid or solid food, provides all nutrients known to be essential to the suport of human life) or in any other form of nutrient defined diet, the resulting color change can be expected to be found objectionable by users. So, too, can the concomitant changed organoleptic qualities, for example, a bitter, metallic taste and an associated acrid, pungent odor. Even more important, the Maillard reaction can actually alter the nutritional values of the product. For example, chemical analysis of such a total elemental diet which had undergone the Maillard reaction while being aged 24 months at 40° F. (4.4° C.) showed a reduction in the level of PABA to 40% below the amount contained in the product at the time of manufacture.

Such elemental diets are described, for example, in U.S. Pat. Nos. 3,773,930, issued Nov. 20, 1973, entitled "Amino Acid Compositions" and 3,821,432, issued June 28, 1974, entitled "Bland Amino Acid Compositions." They contain, among other nutrients, a blend of purified amino acids, free glucose and PABA. Other special dietary foods have been developed which contain amino acids, protein hydrolysates and whole protein, singly or in combination, as well as reducing sugars and, optionally, nitrogen containing vitamins. All of these dietary foods have been shown to suffer from short shelf lives of from six months to one year when stored at ambient temperatures (up to about 86° F. [30° C.]). This has been true even when product moisture levels have been reduced to less than 2% and expensive moisture barrier laminates have been used for packaging. Generally, the higher the finished product temperature and moisture content, the more pronounced or rapid the resultant Maillard reaction will be.

2. Description of the Prior Art

The Maillard reaction has been recognized as a limiting factor on the shelf-life of compositions with which the present invention is concerned, including concentrated elemental diets, since it takes place even when the reactants are in contact in the powdered form in the presence of some moisture (even less than 2%) and even at sub-ambient temperatures. Previous attempts to deal with the problem have not been entirely satisfactory, particularly for powdered elemental diets, and the problem still persists.

U.S. Pat. No. 2,426,634, issued Sept. 2, 1947 to Daniel Melnick, is concerned with enhancing the shelf-life of concentrated food preparations, such as dehydrated soup mixes, by physically separating the amino acid materials from the carbohydrate materials, or by rendering the mix sufficiently acid to inhibit the reaction, or by a combination of these techniques. At column 3, there are presented the general conclusions that darkening (browning, or pigment formation) is enhanced by alkaline conditions, the more alkaline amino acid materials being more reactive. Also, the simpler carbohydrates, the mono- and di-saccharides are disclosed to react more rapidly with the amino acid compounds than the more complex carbohydrates, starches reacting so slowly as to be a negligible factor over "normal storage periods."

The patentee suggests enclosing the dextrose or the amino acid materials in a sheath of methyl or ethyl cellulose or fat or "other materials which will readily dissolve or disperse when the mass is mixed with hot water . . . " While fat may be a natural ingredient of concentrated food, as a coating material it tends to cause flotation in water and is difficult to dissolve. Ethyl and methyl cellulose are not necessary or usual ingredients of an elemental diet. Moreover, the heating required to dissolve the coating of this patent is unacceptable for certain dietary compositions, particularly those containing vitamins, since the nutritional value of such heat sensitive components is thereby adversely affected.

As indicated by the patentee of U.S. Pat. No. 2,305,940, discussed hereinafter, pH adjustment requires care, and presents the risk of adversely affecting taste. The addition of ethyl or methyl cellulose, ingredients not otherwise necessary or desirable in a concentrated elemental diet, could cause other complications in some patients already suffering from abnormal gastric conditions as, for example, patients requiring a low fecal residue diet.

The preparation of a substantially non-hydroscopic edible spray-dried powdery material for use in the baking, brewing and confectionary industries is accomplished in accordance with U.S. Pat. No. 2,305,940, issued Dec. 22, 1946 to J. F. Walsh, by intimately mixing a starch conversion syrup having reducing sugar content of 25% to 65% with a steep water filtrate containing soluble protein, optionally adding diastase, heating to a temperature of about 125° F. (52° C.) to about 150° F. (66° C.) at a pH in the range of about 4.5 to 6.5 to condition the mixture for spray drying without developing any darkening or browning, and then spray-drying the mixture at a temperature not exceeding 150° F. (66° C.) to a moisture content not substantially above 3%. This does not, however, effect a separation between the reducing sugars and the protein of the steep water. Rather as a result of this process, they remain intimately admixed in the spray-dried product.

The use of hydrolyzed cereal solids (starch) having a low D.E. number as a coating for a synthetic cheese or similar product comprising edible fat, a flaked starch carrier, a flavoring agent and, optionally, a coloring agent is shown in U.S. Pat. No. 3,689,290, issued Sept. 5, 1972 to Blackstock et al. The disclosed product appears to contain no protein; and all of the ingredients are mixed together, the entire mix being coated by the low D.E. starch particles.

The problem of preventing the Maillard reaction in synthetic dietary compositions is also dealt with, inter alia in U.S. Pat. No. 3,950,547, issued Apr. 13, 1976 to P. L. Lamar III et al. The patentees, however, teach only to use the less reactive peptides rather than free amino acids and to avoid the presence of reducing sugars in their compositions. However, it is often necessary or desirable to have significant amounts of uncombined amino acids present in the dietary compositions with which the present invention is concerned in order to obtain the exact amino acid profile desired for the nutritional management of certain disease states (e.g. short gut syndrome, kidney and liver dysfunction, inflammatory bowel diseases and inborn metabolic disorders) and to use reducing sugars to provide a readily absorbable and metabolizable carbohydrate, for traumatized and other diseased patients lacking the enzyme disaccharidase, while providing organoleptic properties desired for oral consumption.

The patentees (of U.S. Pat. No. 3,950,547) also disclose and claim the use of specified amounts of high amylose starch in their compositions in order to improve the emulsion stability thereof. However, they do not use starch (or any other material) to separate the components of their compositions that take part in the Maillard reaction.

U.S. Pat. No. 3,962,416, issued June 8, 1976 to S. Kutzen, teaches protecting nutrients, including proteins and other nitrogen containing materials, by encapsulating them in an enteric coating comprising a high protein vegetable material which can contain no more than 40% by weight of non-protein material and which can include starch. The coating is dissolved in the digestive system. Not only is this coating different from that of the present invention, it is unsuitable for use in concentrates of complete elemental diets intended for immediate and complete dissolution or dispersion in water prior to consumption by the user either orally or via tube, the latter requiring a fluid of low viscosity and no, or only very fine, particulate matter. In addition, the enteric coating would retard the rapid absorption necessary for patients with reduced digestive and absorptive capacity in the digestive system (e.g. bowel resections) who would use elemental diets such as those with which the present invention is concerned.

In describing an improved method for encapsulating a condiment by spray drying, U.S. Pat. No. 3,985,913, issued Oct. 12, 1976, to Johnson et al., discloses that the condiment can be, inter alia, a proteinaceous material, and that the coating material can be hydrolyzed cereal solids. In this process, the entire condiment is coated with the hydrolyzed starch, and the process does not result in, nor is it intended for, separation of proteinaceous material of a dry mix from a reducing sugar or other material thereof capable of undergoing the Maillard reaction with the proteinaceous material.

German Offenlegungsschrift No. 25 21 800, filed May 16, 1975, is concerned with the problem of preserving the stability of free amino acids in their passage through the rumen of a ruminant, and discloses covalently bonding the amino acids to intra- or inter-molecularly bridged carbohydrates and natural polyhydroxylic compounds, including both reducing and non-reducing sugars.

U.S. Pat. No. 3,697,287, issued Oct. 10, 1972 to M. Winitz postulates three major causes for objectionable taste in chemically defined diet formulations. These related causes are (1) the inclusion of amino acids or their derivatives which contain sulfhydryl groups; (2) the inclusion of amino acids or derivatives, such as glutamic acid, whose inherent taste is incompatible with the flavor of the remaining ingredients; and (3) the use of amino acids of their derivatives that have bad tasting impurities, such as methyl mercaptan, associated with them. The patentee discloses and claims that when such compositions, containing 0.26 gm of methionine per liter in a solution containing at least about 3 grams of essential amino acids per liter, contain methyl mercaptan in an amount not exceeding about 15 mg per liter, palatability of the product is improved.

SUMMARY OF THE INVENTION

We have discovered that starch having a D.E. number up to about 24 can be used successfully to separate the nitrogen containing components of a solid form elemental diet or similar mixture from the reducing sugars or other carbonyl group containing components that are present in such mixture, preferably by coating the starch on the particulate material, generally the nitrogen containing components (since they are usually present in a smaller quantity than the other active components). Accordingly, in one aspect, the present invention provides a solid composition comprising a nitrogen-containing compound and a compound containing a carbonyl group capable of undergoing the Maillard reaction with said nitrogen compound under ambient conditions, wherein a starch having a D.E. number of from 0 to about 24 physically separates at least a major amount of said nitrogen compound from said carbonyl compound, whereby said Maillard reaction is prevented or substantially delayed during storage.

More particularly, the invention provides a synthetic dietary composition in solid form, typically a powder, for supplying nutritional requirements to a mammal, comprising (1) a proteinaceous material (preferably including at least one free amino acid and optionally also including a nitrogen containing vitamin); (2) a starch and (3) an aldehyde group-containing dietary compound (generally a reducing sugar) wherein the Maillard reaction between said proteinaceous material and said aldehyde compound is prevented or substantially retarded during storage by coating at least a major amount of at least one reactant selected from said proteinaceous material and said aldehyde compound with at least a portion of said starch, the starch used for said coating having a D.E. number of between 0 and about 24.

As indicated, it is usually preferred to coat the nitrogen compound, although, if desired, the carbonyl compound(s) could be coated instead of or in addition to the nitrogen compound(s). Generally, the moisture content of the finished synthetic dietary composition is maintained at or below 8%, preferably not in excess of 5%, by weight, and the temperature is not permitted to exceed about 86° F. (30° C.) for extended periods of time during storage, although the temperature may be permitted to reach 100° F. (38° C.) or even 120° F. (49° C.) for short periods, generally not in excess of a few days.

In another aspect, the invention provides a method for preventing the Maillard reaction, particularly in special dietary compositions or other mixtures of materials which include a nitrogen compound and a carbonyl compound, which method comprises preventing contact between said nitrogen compound and said carbonyl compound by interposing a starch having a D.E. number between 0 and about 24 therebetween, maintaining the moisture content of the resulting composition below about 8%, preferably not in excess of 5%, by weight, and maintaining the temperature of said composition below about 49° C. preferably below 38° C. more preferable below about 30° C. In a preferred embodiment, the method comprises coating at least one of the reactive compounds, preferably the nitrogen compound, with the starch.

DESCRIPTION OF THE PREFERRED EMBODIMENTS

Naturally, sufficient starch must be used to obtain effective separation of the reactive components by substantially coating at least most of the nitrogen compounds or of the carbonyl compounds (or of both). As a practical matter, at least about 1% by weight of the total composition of starch must be used. The ratio of coating starch to coated reactive material may vary widely within the broad range of 1:99 to 99:1 parts by weight. Typically, the coating ratio of starch to reactive material is between about 10:90 and 50:50 parts by weight, particularly when the coated material is a nitrogen compound. Any amount of starch sufficient to effect adequate coating, up to the full amount of starch otherwise dictated by the nutritional, flavor, texture and other requirements of the final product, may be employed in the practice of this invention. Thus the amount of total starch in the composition is determined by the desired nutritional, taste and textural characteristics of the final product. Similarly, the degree of hydrolysis of the starch is also somewhat dependent on the end use of the mixture of components. For example, when the mixture is intended to be diluted with water to make a soup, beverage or tube feeding and low viscosity is necessary, unhydrolyzed starch has been found to be unsuitable, as it tends to cause the composition to become too viscous upon dilution with water. On the other hand, when the mixture is intended to be served in a semi-solid form (e.g. as a pudding or sauce), less dilution with water is possible and modified unhydrolyzed starch (i.e. starch processed to be diluted with cold tap water), or unmodified unhydrolyzed starch (i.e. starch intended to be diluted with hot water) may be used in the composition.

In a preferred embodiment of the invention, the amino acids and other proteinaceous material contained in an elemental diet are coated with the starch, an ingredient already present in the product. By using an ingredient already in the product as the coating material, the nutritional values and solubility of the original formula are maintained. Moreover, coating the amino acids and other proteinaceous material with starch has inhibited the Maillard reaction, thus permitting the relaxation of certain rigid specifications required by uncoated product so as to permit the use of less complex packaging materials, higher levels of acceptable moisture, less stringent raw material particle size requirements and easier shipping and storage restrictions. Particularly when the elemental diet product is intended for use in liquid form, it is preferred that the coating starch have a D.E. number in excess of 0 (but not in excess of about 24). A preferred range for the D.E. number is between about 5 and about 15. More particularly, we have found that coating the amino acids and other proteinaceous materials with hydrolyzed cereal solids having an approximate D.E. of 10 has eliminated the Maillard reaction in product aged at 30° C. for 28 months, a significant improvement over the shelf-life of products containing uncoated amino acids.

The source of the starch can be from corn, rice, cassava, arrowroot, potato, taro, or any other vegetable from which starch can be made.

The starch may be hydrolyzed by known techniques, for example, by acid hydrolysis, with neutralization of excess acid with an alkali or by enzymatic hydrolysis, in which either the enzyme carbohydrase is introduced directly into a starch slurry or the starch slurry is passed through a column containing embedded carbohydrase.

Unhydrolyzed starch has a D.E. of 0. As the starch becomes increasingly hydrolyzed, as is well known in the art, the D.E. increases with degree of hydrolysis.

Partially hydrolyzed starches having specified D.E. numbers or ranges suitable for use as the coating starch in the practice of this invention are also available commercially, for example: Grain Processing Corporation's MALTRIN 5 and 10 (D.E. 5 and 10), American Maize's FRODEX products (D.E. 15 and 24). Corn Products Corporation's MOREX-1918 (D.E. 10), Clinton Corn Processing's CLINTOSE products (D.E. 15 and 24) and others. In each of the above cases the D.E. numbers indicated by the manufacturer represent an average, and the product actually has a range of D.E. values close to, but straddling, the average. For example, MOREX-1918 has a D.E. range of about 9 and 11 and has the following sugar distribution:

| Sugars | Percent by Weight |
| --- | --- |
| Mono-saccharides | 1% |
| Di-saccharides | 4% |
| Tri-saccharides | 5% |
| Tetra-saccharides | 4% |
| Penta-saccharides | 4% |
| Hexa-saccharides and higher | 82% |

As already indicated, hydrolyzed starch is necessary to obtain a sufficiently low viscosity in a liquid end product.

We have investigated several techniques for preventing the Maillard reaction, all based on the principle of physically separating the reactive ingredients, either in packaging or by coating one of the reactive components, generally the amino acids and other proteinaceous materials, with another material. Coating materials investigated included fat, sucrose (a non-reducing sugar), pectin, pectin and sucrose, gelatin, cellulose derivatives (e.g. ethylcellulose wax, carboxymethylcellulose [CMC] and hydroxypropylcellulose [available under the trademark KLUCEL from Hercules Corp.]), native starch (having a D.E. of 0) and starch derivatives having various Dextrose Equivalents. Some details of alternatives to the starch coating approach of the present invention, as well as the shortcomings of these alternatives, are summarized below.

The most simple approach, direct physical separation of the reactive components by enclosing the amino acid components in one packet and the remainder of the dietary mixture in another separate packet, prevented the Maillard reaction. However, this twin-packet approach did not prove feasible because (1) it was too costly, and (2) hospital nutritionists, dietitians and other professionals involved found unacceptable the risk that inexperienced personnel preparing the product for serving to patients might neglect to include one of the packets in the mixing procedure, with a resulting change in the recommended nutritional profile.

Modification of this twin-packet approach resulted in a single packet partitioned with (1) a seal across the center of the packet or (2) a vertical polyethylene membrane, thus forming in one packet two compartments by which the reactive components were separated. This approach was discarded due to the high cost of designing and building special, single purpose filling and packaging machinery. Inconvenience of use was another negative consideration.

Another attempt at physically separating the reactive components was made with a packet-within-a-packet concept. The amino acid components were placed in an edible, soluble, carbohydrate polymer packet. This packet was placed inside another chemically inert, outside packet that contained the remainder of the nutritional composition. It was conceived that, when the outer packet was opened and its contents dispensed into water, the inner packet would dissolve and contribute to the nutritional composition. This approach was rejected for reasons of practicality, including the cost and the difficulty of maintaining the physical integrity of the inner packet during manufacture, shipping and storage.

The amino acids were coated with pectin alone, with sucrose alone and with pectin and sucrose combined. In each case, an aqueous slurry was made of the proposed coating material and the amino acid mixture. The slurry then was dried in a vacuum oven and ground to a fine powder. The resulting mixture was blended with the remainder of the dietary components and subjected to accelerated aging. A similar experiment was repeated using a spray drier in lieu of the vacuum oven. While of some benefit, these techniques did not sufficiently alter the rate of the Maillard reaction. As regards the coatings containing sucrose, it is postulated that, during processing, small amounts of sucrose were hydrolyzed to glucose and fructose, which are reducing sugars that would initiate the Maillard reaction. This reaction requires a relatively low order of energy for its initiation and exhibits autocatalytic qualities once it has started. We found that starch having a D.E. number between 0 and 24 was far superior in overall qualities as a coating to prevent the Maillard reaction.

A coating of unhydrolyzed starch, with a D.E. of 0, provides the maximum protection against the Maillard reaction. This is obviously because no aldehyde groups are present in unhydrolyzed starch to react with the amino nitrogen groups of the amino acids, or with other nitrogen containing compounds. Dextrose, by definition having a D.E. of 100, presents the greatest concentration of aldehyde groups available for reaction with the nitrogenous components, thus giving the least protection against, and in fact promoting, the Maillard reaction. Coatings with starches having dextrose equivalents between 0 and 100 would provide protection roughly inversely proportional to their D.E. values. Our experiments indicate that the Maillard reaction is sufficiently inhibited, and thus satisfactory shelf-life obtained, when coatings of D.E. 0 to about 24 are applied to the reactive components of the dietary mixture, with the preferred D.E. being between about 5 and about 15 for concentrates intended for consumption as liquid beverages, soups or tube feedings. Starch having a D.E. 0 is acceptable for semi-solid and solid foods (e.g. pudding, sauce and the like).

As previously indicated, moisture content and temperature are also important factors contributing to the initiation and propagation of the Maillard reaction. Low temperature and low moisture content both are important in retarding the Maillard reaction. For products coated in accordance with the present invention, a satisfactory shelf-life of at least about one year is obtained if the moisture content of the product (containing coated reactant) is maintained below about 8% by weight, preferably not in excess of about 5% by weight, and the temperature does not exceed about 30° C. In most instances, when the above parameters are observed, psychosensory signs of the Maillard reaction are prevented for at least two years under normal storage conditions.

Generally it is preferred to effect coating of the active components, e.g. the amino acids, with the starch by slurrying the amino acids or other active component and starch in water and then spray drying. Other acceptable methods include freeze drying and vacuum drying from aqueous mixtures. However, spray drying appears to be preferably as it is less costly, particularly as regards energy requirements.

The amino acids used in the dietary compositions of the invention comprise one or more pure, individual amino acids, either in the levorotatory (L) form or in mixtures of both the levorotatory and dextrorotatory (D) form. A part or all of the amino acid portion may be in the form of the free base or in the form of the alkyl esters, hydrochlorides, hydrates or combinations thereof, these all being available as white crystalline powders.

The term "individual amino acids" means those hydrocarbons possessing at least one amino and at least one carboxylic acid group, generally having the structure $NH_2RCHCO_2H$, where the side chain R may be of diverse composition and structure. Encompassed within the definition are the aliphatic amino acids including the monoaminomonocarboxylic amino acids such as glycine, alanine, isoleucine, leucine and valine; the hydroxymonoaminomonocarboxylic amino acids such as serine and threonine; the monoaminodicarboxylic amino acids such as aspartic acid and glutamic acid; the monoaminodicarboxylic-ω-amides such as asparagine and glutamine; the diaminomonocarboxylic amino acids such as arginine, lysine, and 5-hydroxylysine; and the sulfur-containing amino acids such as cysteine, cystine, methionine and taurine. Also encompassed by this term are the aromatic amino acids such as phenylalanine and tyrosine and the heterocyclic amino acids such as tryptophan, histidine, proline, and 4-hydroxyproline. Excluded from the definition of individual amino acids are the polyamino acids such as proteins and peptides, although these may also be included in the dietary compositions of this invention.

Preferably, the amino acid portion supplies the entire nutritional nitrogen requirements of the user, and, accordingly, includes the nutritional equivalent of at least the eight so-called indispensable or essential amino acids, present in such amounts as to supply, when taken as suggested, at least their respective minimum daily requirements, as reported by Rose, W. C. and Wixom, R. L., Journal of Biological Chemistry, 217, 997 (1955) and listed below:

| Essential Amino Acid | Minimum Daily Requirement (gm./day) |
|---|---|
| L-valine | 0.80 |
| L-leucine | 1.10 |
| L-isoleucine | 0.70 |
| L-threonine | 0.50 |
| L-methionine (or DL-methionine) | 1.10 |
| L-phenylalanine | 1.10 |
| L-tryptophan | 0.25 |
| L-lysine | 0.80 |

In addition to these eight essential amino acids, others may be provided and, in some instances, are necessary for complete nitrogen nutritional adequacy, depending on age, state of health and on the existence or absence of such factors as pregnancy, lactation or malnutrition. Such additional amino acids (hereinafter termed non-essential) include, for example, tyrosine, alanine, aspartic acid, glutamine, proline, serine, arginine, histidine, cystine, cysteine and taurine. Thus, for example, children, as well as patients suffering from uremia, require an exogenous supply of arginine, histidine and cystine, which are therefore often referred to as semi-essential amino acids. The amino acid profile of the dietary compositions can range from 100% essential to 100% non-essential and is preferably within the range of from about 70% essential to about 70% non-essential amino acids.

It is contemplated that the dietary compositions of this invention will be used to supply basic nutrition to their users and, accordingly, nutrients other than amino acids may be incorporated therein, such as carbohydrates, fats, vitamins and minerals.

In general, when the composition is to supply all the basic nutritional needs of an adult user, the total caloric value of the non-amino acid nutrients should be sufficient to provide a daily caloric intake of about 1,000 to about 8,000 kilocalories, a specific value within this range depending upon such factors as the state of health and activity of the user. Relatively nonactive users, such as non-ambulatory patients, may be supplied with a lesser amount of caloric material such as, for example, about 1,000 to about 2,000 kilocalories per day, whereas highly active users and those suffering from severe traumatic conditions may require from about 3,000 to about 8,000 kilocalories per day.

It should be understood that substantially all of the non-amino acid-derived caloric value is derived from carbohydrates and fats with a minor portion derived from flavoring materials and an essentially negligible portion derived from vitamins and minerals. The carbohydrates may be, for example, sugars, starches or combinations thereof such as are obtained upon the hydrolysis or conversion of starches. The source of the starches or their derivatives can be from corn, rice, cassava, arrowroot, potato, taro or any other vegetable from which starch can be made. A useful sugar combination is a mixture of sugars resulting from the hydrolysis of such starches as cornstarch, tapioca starch and rice starch, whereby the starch is converted, as for example by acid or enzyme treatment, to a mixture of mono-, di-, and tri-saccharides and higher sugars, such a mixture being available, for example, under the trademark of FRODEX from the American Maize Products Company. The table below illustrates the sugar distribution found in FRODEX 36, an acid treated cornstarch having a dextrose equivalent of 36.

| Sugar | Percent by Weight |
| --- | --- |
| Mono-saccharides | 14.1 |
| Di-saccharides | 11.7 |
| Tri-saccharides | 10.2 |
| Tetra-saccharides and heavier | 64.0 |

At least a portion of the non-amino caloric material may be provided in the form of fat, with the additional advantage that the nutritional requirements of the user with respect to essential fatty acids may thereby be provided. Generally, because users of these compositions are in a condition wherein their normal activities are restricted, the quantity of fat added to the diet should be lower than the normal fat intake for an active individual.

The fat may be provided in various forms. Natural fat components such as, for example, safflower oil, soy bean oil, linseed oil, olive oil, corn oil, cotton seed oil and coconut oil may be used. Alternatively, fat may be provided in a chemically defined form, such as the glycerol or other esters of a fatty acid, for example the medium chain length triglycerides (i.e. 6–12 carbon atoms per fatty acid chain) or such alkyl esters of a fatty acid as ethyl linoleate.

Flavoring materials may be either synthetic or natural, the latter including the oils of fruits, berries and vegetables or animal extracts, which may be added and will contribute a minor portion of the nutritional requirements of the user.

The vitamins may include, for example, Vitamin A, Vitamin D, Vitamin $B_{12}$, Vitamin C, Vitamin K, dl-alpha tocopherol, para-amino benzoic acid (PABA) or its salts, pantothenic acid or its salts, choline or its salts, folic acid, inositol, niacinamide, riboflavin, pyridoxine or its salts, and thiamine or its salts. In general, when supplying the total vitamin intake of a user with the compositions of this invention, about 10 to about 100 milligrams of vitamin mixture should be included per gram of amino acids. The minerals may include edible sources of sodium, potassium, phosphorus, calcium, magnesium, manganese, copper, zinc, iron and iodine. These minerals are provided as salts, e.g. chloride, gluconate, citrate, bitartrate or acetate. Minerals, when supplied with the compositions of this diet as the sole source of mineral nutrition, should be present in the ratio of about 0.3 grams to about 2.4 grams of mineral mixture per gram of amino acids.

The compositions are often administered orally by dispersing them in a suitable quantity of a diluent such as water. Generally, the amino acid concentration in the form administered may range from a very dilute solution or dispersion to a concentration as high as about 450 grams of amino acids per liter of water. Extreme dilution is limited by such factors as the undesirability of feeding large quantities of diluent to a user or the inconvenience of requiring large volumes of the solution or dispersion to be administered in order to supply sufficient quantities of amino acids. Preferably, no less than about 10.0 grams of amino acid per liter of water are used.

At amino acid concentrations of up to about 250 grams per liter, a well-dispersed beverage results. When it is desired to produce a sauce or pudding, or at the higher amino acid concentrations where dispersion is difficult, a suitable gelling or thickening agent, such as, for example, agar, locust bean gum, xanthan gum, gum acacia, gum tragacanth, or modified cellulose may be added. By incorporating one or more of these agents into the composition, in combination with starch or modified starch, in quantities of the order of about 2 grams to about 100 grams of agent per liter of water, a pudding-like dietary composition results.

The dietary compositions of this invention may be prepared by blending the various components in conventional dry solids blending equipment and may be packaged for later dispersal in water in various portion-sized packages and containers or in bulk. Alternatively, the dietary composition may be administered dry, in tablet, capsule, loose powder or food analog form.

In accordance with the teachings of U.S. Pat. No. 3,773,930, the dietary compositions of the invention preferably also contain pectin, generally in an amount of from about 0.01 grams to about 0.4 grams per gram of amino acids, more desirably in an amount of between about 0.025 and about 0.25 grams of pectin per gram of amino acids.

Similarly, in accordance with the teachings of U.S. Pat. No. 3,821,432, the dietary compositions preferably will also include small quantities of oil of ginger, preferably in an amount of from about 0.04 to about 1.2 milligrams of oil of ginger per gram of amino acids.

The present invention is further illustrated by the following examples in which various materials were utilized to coat amino acid mixtures suitable for incorporation in nutrient defined special dietary foods.

In some cases, these mixtures were of purified free amino acids alone. In other cases, amino acids were present in purified form and as di-, tri- and longer peptides derived from predigested protein. As indicated above, the latter are also reactive with reducing sugars to produce the Maillard reaction.

Materials investigated for coating the amino acid-peptide mixture included fat, pectin, sucrose, pectin and sucrose, gelatin, gelatin and cellulose derivatives (e.g. carboxymethylcellulose and hydroxypropylcellulose), the cellulose derivatives alone, and water soluble, or water dispersible, food grade starch and starch derivatives. The coated amino acids, as well as uncoated controls, were mixed with dextrose alone at a 1:1 weight ratio to provide samples considered to be a stringent test in conditions most likely to cause the Maillard reaction.

Other samples included mixtures of coated and uncoated (control) amino acids with the remainder of the dietary composition, which always included carbohydrates containing reactive aldehyde groups. These other samples were more representative of products likely to be marketed for special dietary use. The samples generally had a moisture content of approximately 5% by weight. Aging stability against the Maillard reaction was tested at a variety of temperatures ranging from about 20° C. (70° F.) to about 48.9° C. (120° F.).

Although all coating materials were effective against the Maillard reaction to some degree as compared to uncoated controls, the mixtures showing the greatest resistance to the browning reaction were those in which the amino acids were coated with native starch or a starch derivative. However, starch derivatives of sufficiently low D.E. number were found to have more utility than unmodified starch in compositions intended for administration as beverages, by virtue of both being effective in preventing or retarding the Maillard reaction and having dispersibility or solubility. Moreover, in addition to being more readily dispersible than unmodified starch, starch derivatives are more easily digestible and therefore preferred over unnmodified starch as components of the elemental diet formulas with which the present invention is primarily concerned.

EXAMPLE 1

An amino acid blend (Table I) was coated by spray drying with unmodified, native starch (DE 0) in ratios of 60:40 and 50:50 (w/w) starch to amino acids and then combined with the other ingredients of an elemental dietary food (Table II). The moisture content of the samples was about 5% as determined by the Karl Fischer method (Karl Fischer Water Determination Method, Food Chemical Codex, 2nd ed., Nat'l Academy of Sciences, 1972, p. 977) and/or by computation based on the label moisture contents of the components. An accelerated aging study at 49° C. for 24 days against a 4° C. control showed that starch-coating the amino acids retarded the Maillard reaction and therefore would extend the shelf life of the product. When this product was reconstituted with water, however, the starch separated and floated to the top, making the use of unmodified starch (DE 0) unacceptable as a coating in a product designed to be reconstituted to liquid beverage or tube feeding form. This experiment did, however, establish that unmodified starch can be used in the coating process to give maximum protection against the Maillard reaction, although it would be acceptable for use only in a product designed to be formulated as a solid or semi-solid food analog (such as puddings, or sauces).

Table I

| Amino Acids | Gm/Kilo (as is basis) |
|---|---|
| Essential Amino Acids | |
| L-leucine | 10.311 |
| L-lysine HCl | 9.815 |
| L-isoleucine | 7.943 |
| L-valine | 7.448 |
| DL-methionine | 5.876 |
| L-phenylalanine | 5.790 |
| L-threonine | 5.080 |
| L-tryptophan | 1.378 |
| Non-essential Amino Acids | |
| L-glutamine | 10.827 |
| *L-arginine HCl | 9.536 |
| L-tyrosine ethyl ester HCl | 5.489 |
| L-aspartic acid | 4.219 |
| L-serine | 2.669 |
| *L-histidine HCl . $H_2O$ | 2.432 |
| L-proline | 2.131 |
| L-alanine | 1.249 |
| | 92.123 |

*Semi-essential amino acids

Table II

| Vitamins | GM/Kg (as is basis) |
|---|---|
| Choline Bitartrate | 1.1139 |
| Vitamin E (Acetate) | 0.3229 |
| Vitamin C | 0.3009 |
| Vitamin A & D | 0.0758 |
| Niacinamide | 0.0646 |
| Pantothenic Acid (Calcium salt) | 0.0585 |
| Vitamin $K_1$ | 0.0323 |
| Pyridoxine | 0.0105 |
| Thiamine (Mononitrate) | 0.0064 |
| Riboflavin | 0.0055 |
| Vitamin $B_{12}$ | 0.0026 |
| d-Biotin | 0.0020 |
| Folic Acid | 0.0015 |
| Total Vitamins | 1.9973 |

| Minerals | Gm/Kilo (as is basis) |
|---|---|
| Magnesium Gluconate | 15.956 |
| Calcium Gluconate | 13.872 |
| Calcium Lactate | 9.934 |
| Potassium Phosphate | 9.457 |
| Sodium Citrate | 6.479 |
| Sodium Acetate | 3.089 |

Table II-continued

| | |
|---|---|
| Potassium Citrate | 1.796 |
| Ferrous Gluconate | 0.335 |
| Zinc Acetate | 0.108 |
| Manganese Gluconate | 0.098 |
| Copper Gluconate | 0.031 |
| Potassium Iodide | 0.0004 |
| Total Minerals | 61.1554 |

| Fat | Gm/Kilo |
|---|---|
| Safflower oil | 22.614 |
| Total Fat | 22.614 |

| Carbohydrate | Beverage Gm/Kilo | Unflavored Broth Base |
|---|---|---|
| Dextrose | 344.645 | 0 |
| Corn Syrup Solids (DE 36) | 267.450 | 0 |
| Hydrolyzed cereal solids (DE 10) | 153.658 | 811.041 |
| Total Carbohydrate | 765.753 | 811.041 |

| Miscellaneous | Beverage (and Flavored Broth) Gm/Kilo | Unflavored Broth Base |
|---|---|---|
| Pectin-ginger blend | 10.760 | 10.760 |
| Coloring & Flavoring | 45.289 | 0 |
| Sorbic Acid | 0.239 | 0.239 |
| Total | 56.288 | 10.999 |

EXAMPLE 2

A large batch of the amino acid mixture of Table 1 of Example 1 was coated with a modified starch hydrolysate having a D.E. of approximately 10. The ratio of the amino acid mixture to starch hydrolysate in the coated product was 1:1.

Both the coated product and uncoated amino acid control were blended with the remaining components of the finished products (substantially as listed in Table II of Example 1). All samples had a moisture content of about 5%.

The dietary formula was packaged in 30 gram amounts. These materials were dispensed into packets which were then nitrogen flushed and heat sealed. The packaging material was a laminate of polyethylene, pin-hole-free one-mil aluminum foil and cellophane. The filling of the nitrogen flushed pouches with the dietary food powder was accomplished with a commercial filling and packaging machine.

Three flavor variations were packaged (unflavored broth base, flavored broth and orange flavored beverage). Identical samples were placed in aging at 30° C. and 4.4° C., the latter temperature serving at the appropriate control.

Nutrient and organoleptic analyses after 12 months aging at 30° C. showed no appreciable changes in potency or organoleptic properties when compared with the 4.4° C. controls. After 28 months at 30° C. no detectable signs of the Maillard reaction were found by our trained, organoleptic appraisal panel in any of the samples.

EXAMPLE 3

Another experiment was conducted in which the coating material used was FRODEX 24, a starch hydrolysate marketed by American Maize Corp. having an everage D.E. of approximately 24. The coating was carried out in three runs, in which the ratios of starch hydrolysate coating to amino acids were, respectively, 20:80, 30:70. and 40:60, as described below.

An aqueous slurry was mixed by adding water to the amino acid mixture until all solids had dissolved. A similar slurry was made with the hydrolyzed cereal solids.

For the 20% coating, the hydrolyzed cereal solids and amino acid slurries were combined so as to result in a mixture in which the solids were present in the ratio of 20:80, hydrolyzed cereal solids coating material to amino acid blend. In a similar manner, combined slurries were mixed so that the solids of the coating and the amino acid mixtures were blended in ratios of 30:70 and 40:60. Each of the resulting blends was slowly fed into a commercial, steam jacketed spray drier. Both inlet and outlet temperatures were regulated in such a way as to obtain a spray dried product with a moisture content of less than 5% as determined by the Karl Fischer moisture determination method.

Each blend was mixed 50:50 (by weight) with milled dextrose (milling increased surface area so as to provide a more rigid test of the efficacy of the coating technique). One sample of each coating was aged at each of several different temperature levels ranging from 4.4° C. to 48.9° C. As a control, an uncoated amino acid mixture was combined with the same milled dextrose, 50:50, and aged at the same temperatures. A summary of results obtained with the 40:60 coating samples at three temperature levels is presented in Table III.

Results of the aging study showed that a coating of hydrolyzed cereal solids with an average D.E. of 24 can be used to reduce the rate of the Maillard reaction, at a moisture content of up to 2.4%. Based on the above data and the established relationship between D.E. number and the rate of the Maillard reaction, it is apparent that hydrolyzed cereal solids of substantially higher D.E. than 24 would result in an unacceptable rate of the Maillard reaction, although some protection might be afforded.

Table III

Color Comparison of Coated Amino Acids* Mixed with Anydrous Dextrose in a Ratio of 1:1 at 3 Temperatures

COATED AMINO ACIDS (1)

| Temp. in C.° | Aging in Days | | | | | | |
|---|---|---|---|---|---|---|---|
| | 0 | 11 | 56 | 63 | 98 | 161 | 196 |
| 48.9° | 0 | ++ | # | # | # | # | # |
| 38.8° | 0 | 0 | 0 | 0 | + | +++ | ++++ |
| 4.4° | 0 | 0 | 0 | 0 | 0 | 0 | + |

UNCOATED AMINO ACIDS (2)

| Temp. in C.° | Aging in Days | | | | | | |
|---|---|---|---|---|---|---|---|
| | 0 | 11 | 56 | 63 | 98 | 161 | 196 |
| 48.9° | 0 | ++ | ++++ | +++++ | >5+ | >5+ | >5+ |
| 38.8° | 0 | + | +++ | +++++ | >5+ | >5+ | >5+ |
| 4.4° | 0 | 0 | 0 | 0 | + | + | + |

Key:
*=Coated with FRODEX 24, in the ratio of 60:40 amino acid to FRODEX
(1) = Moisture content 2.3%
(2) = Moisture content 0.3%
0 = No detectable color/odor change
+ = Barely detectable color/odor change
++ =
+++ = ] intermediate intensities of browning
++++ = ] and acrid odor
+++++ = Color changed to dark brown, odor acrid and pungent.
# = Not analyzed.

Variations can, of course, be made without departing from the spirit and scope of the invention.

Having thus described the invention, what we desire to secure by Letters Patent and hereby claim is:

1. A non-fluid composition comprising a nitrogen compound and a carbonyl compound capable of undergoing the Maillard-type browning reaction with said nitrogen compound under ambient conditions, wherein a material consisting essentially of a starch having a DE number of from 0 to about 24 physically separates at least a major proportion of said nitrogen compound from said carbonyl compound, whereby said Maillard reaction is prevented or substantially delayed during storage.

2. The composition of claim 1 wherein said starch is present as a coating on at least one of said nitrogen compound and said carbonyl compound.

3. The composition of claim 2 wherein said starch coats said nitrogen compound.

4. The composition of claim 3 in powder or granule form.

5. The composition of claim 2 wherein the weight ratio of said coating starch to said coated compound is between about 1:99 and 99:1.

6. The composition of claim 2 wherein the weight ratio of said coating starch to said coated compound is between about 10:90 and 50:50.

7. The composition of claim 1 wherein said starch comprises at least about 1 percent by weight of said composition.

8. The composition of claim 1 wherein said starch has a D.E. number in excess of 0.

9. The composition of claim 1 wherein said starch has a D.E. number between about 5 and about 15.

10. The composition of claim 1 wherein said starch has a D.E. number of about 10.

11. A non-fluid, synthetic dietary composition for supplying nutritional requirements comprising (1) a proteinaceous material, (2) an aldehyde group containing dietary compound, and (3) a starch, wherein the Maillard reaction between said proteinaceous material and said aldehyde compound is prevented or substantially retarded during storage of said composition by virtue of at least a major proportion of at least one reactant selected from the group consisting of said proteinaceous material and said aldehyde compound being coated with a material consisting essentially of at least a portion of said starch, the starch used for said coating having a D.E. number of between 0 and about 24.

12. The composition of claim 11 in powder or granule form.

13. The composition of claim 11 wherein said proteinaceous material is coated with said starch.

14. The composition of claim 11 which has a moisture content not in excess of about 8 percent by weight.

15. The composition of claim 11 which has a moisture content not in excess of about 5 percent by weight.

16. The composition of claim 13 wherein the weight ratio of said coating starch to said coated compound is between about 1:99 and 99:1.

17. The composition of claim 16 wherein the weight ratio of said coating starch to said coated compound is between about 10:90 and 50:50.

18. The composition of claim 17 wherein said starch has a D.E. number in excess of 0.

19. The composition of claim 18 wherein said starch has a D.E. number between about 5 and about 15.

20. The composition of claim 19 wherein said starch has a D.E. number of about 10.

21. The composition of claim 13 wherein said proteinaceous material is selected from the group consisting of the individual amino acids, the proteins and the peptides.

22. The composition of claim 21 which comprises at least one essential amino acid.

23. The composition of claim 13 wherein said aldehyde compound comprises a reducing sugar.

24. A synthetic dietary composition in powder form having a moisture content not greater than about 8% by weight, for dilution with varying amounts of water to prepare a liquid or semi-solid low residue essential diet beverage, soup, pudding or sauce, said powder composition comprising at least one reducing sugar and at least one essential amino acid in free or combined form, said amino acid as well as any other nitrogen-containing ingredients of said composition having coated thereon a sufficient amount of a material consisting essentially of a starch having a D.E. number of from in excess of 0 to about 24 to retard the Maillard reaction to the extent that there is no visible discoloration of said powder nor deterioration in the organoleptic properties thereof during storage over a period of at least about 1 year at ambient temperatures averaging about 30° C.

25. A method for preventing the Maillard reaction between a solid dietary nitrogen compound and a solid carbonyl compound comprising the prevention of contact between said reactive compounds by interposing between said nitrogen compound and said carbonyl compound a material consisting essentially of a starch having a D.E. number between 0 and about 24, maintaining the moisture content of the resulting composition below about 8% by weight, and maintaining the temperature of said composition below about 38° C.

26. The method of claim 25 wherein said contact prevention is accomplished by coating at least one of said reactive compounds with said starch.

27. The method of claim 26 wherein said coating is effected by slurrying said starch with one of said reactive compounds in aqueous medium and subsequently drying the slurry.

28. The method of claim 27 wherein said drying is effected by spray drying.

29. The method of claim 27 wherein said drying is effected by freeze-drying.

30. The method of claim 27 wherein said drying is effected by vacuum drying.

31. The method of claim 26 wherein said coated reactive compound is a nitrogen compound.

32. The method of claim 31 wherein said nitrogen compound comprises proteinaceous material selected from the group consisting of the individual amino acids, the proteins and the peptides.

33. The method of claim 32 wherein said nitrogen compound comprises at least one essential amino acid.

34. The method of claim 26 wherein said coated reactive compound comprises an aldehyde compound.

35. The method of claim 30 wherein said starch has a D.E. number in excess of 0.

36. The method of claim 35 wherein said D.E. number is between about 5 and about 15.

37. The method of claim 36 wherein said D.E. number is about 10.

38. The method of claim 30 wherein said temperature is generally maintained below about 30° C.

39. The method of claim 30 wherein said moisture content is maintained at a level not in excess of about 8% by weight.

40. The method of claim 39 wherein said moisture level is not in excess of about 5% by weight.

* * * * *